United States Patent [19]
Liggat et al.

[11] Patent Number: 6,069,223
[45] Date of Patent: *May 30, 2000

[54] PROCESS FOR MAKING AN AROMATIC POLYMER

[75] Inventors: John Jamieson Liggat, Glasgow; Catherine Jane Wilde; Philip Anthony Staniland, both of Cleveland, all of United Kingdom

[73] Assignee: Victrex Manufacturing Limited, Lancashire, United Kingdom

[*] Notice: This patent issued on a continued prosecution application filed under 37 CFR 1.53(d), and is subject to the twenty year patent term provisions of 35 U.S.C. 154(a)(2).

[21] Appl. No.: 08/737,314

[22] PCT Filed: May 17, 1995

[86] PCT No.: PCT/GB95/01109

§ 371 Date: Nov. 12, 1996

§ 102(e) Date: Nov. 12, 1996

[87] PCT Pub. No.: WO95/31502

PCT Pub. Date: Nov. 23, 1995

[30] Foreign Application Priority Data

May 18, 1994 [GB] United Kingdom .................... 9409885

[51] Int. Cl.[7] .......................... C08G 61/12; C08G 65/40; C08G 65/48; C08K 5/00
[52] U.S. Cl. .......................... 528/171; 528/174; 528/206; 528/212; 528/217; 528/219
[58] Field of Search ...................... 528/206, 212, 528/217, 171, 174, 219

[56] References Cited

U.S. PATENT DOCUMENTS

| | | | |
|---|---|---|---|
| 4,380,621 | 4/1983 | Nield et al. | 528/287 |
| 4,657,990 | 4/1987 | Daost et al. | 525/471 |
| 4,690,972 | 9/1987 | Johnson et al. | 524/609 |
| 5,210,128 | 5/1993 | Johnson | 524/609 |

FOREIGN PATENT DOCUMENTS

| | | |
|---|---|---|
| 0 152 161 | 8/1985 | European Pat. Off. . |
| 0 221 567 | 5/1987 | European Pat. Off. . |
| 0 296 877 | 12/1988 | European Pat. Off. . |

OTHER PUBLICATIONS

Gächter R. Müller H. "Taschenbuch der kunststoff–aditive", 1989, Carl Hanser, p. 898.

*Primary Examiner*—Jeffrey C. Mullis
*Attorney, Agent, or Firm*—Arent, Fox Kintner, Plotkin & Kahn

[57] ABSTRACT

A process for making a crystallizable aromatic polymer comprises polycondensing difunctional monomers in the presence of a base and adding to the reaction mixture a nucleating agent. The nucleating agent comprises a nucleophilic group and a group of formula —A—X, where X is a metal cation and A is an anion. It is selected to give an increase in the peak crystallization temperature of the nucleated polymer compared to the unnucleated polymer.

11 Claims, 2 Drawing Sheets

△ NUCLEATED FINAL POLYMER

▨ UNNUCLEATED CONTROL POLYMER

PROCESS FOR MAKING AN AROMATIC POLYMER

This invention relates to a process for promoting crystallisation of a polymer and, in particular, an aromatic polymer.

Aromatic polyethers containing ketone and/or sulphone and ether and/or thioether linkages have been known for many years. Such polymers find use in applications where resistance to high temperatures is required, for example, injection moulding of shaped articles. Especially useful are those polymers which exhibit crystallinity since such polymers display resistance to solvents and other environmental hazards as compared to amorphous polymers.

However, the rate at which such polymers crystallise, and, indeed, whether they crystallise from the melt at all, varies considerably, even at times from batch to batch of the same polymer. This variation can cause significant problems in applications, such as injection moulding articles, where consistent, rapid crystallisation is required.

European patent specification 152 161 describes a process for making a crystallisable polyetherketone which comprises modification of a preformed polyetherketone by reaction thereof with a nucleophilic reagent, such as NaOPhSO$_3$Na. However, the process described therein is less effective for high molecular weight polyetherketones having a number average molecular weight greater than 12,000.

It is an object of the present invention to provide a method of making crystallisable polyarylethers and polyarylthioethers having improved rates of crystallisation.

According to the invention a process for making a crystallisable aromatic polymer having divalent aromatic units connected by ether and/or thioether linkages comprises polycondensing, under substantially anhydrous conditions in the presence of a base, difunctional monomers having phenolic and/or thiophenolic and/or halogenic end groups and being selected to form a crystallisable polymer and adding to said polycondensation reaction mixture a nucleating agent which comprises a nucleophilic group and a group of formula —A—X, where X is a metal cation and A is an anion and which is selected to give an increase in peak crystallisation temperature, as compared to the peak crystallisation temperature, if obtainable, of the polymer made without said nucleating agent.

Figure 1A:
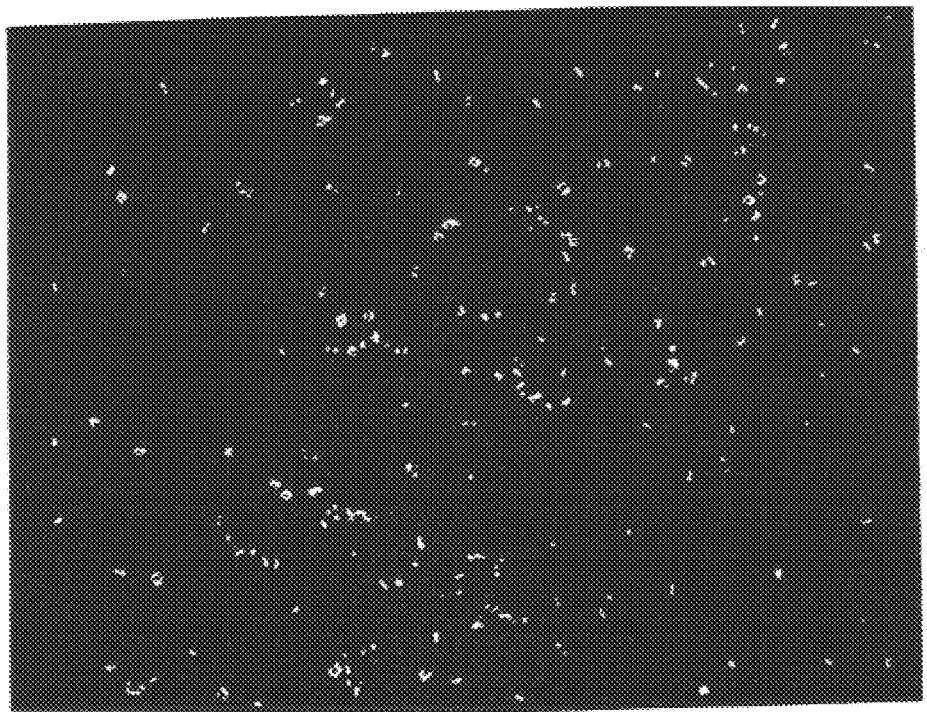
FIGS. 1a and 1b are polarized light micrographs of the product of example 1(b).

The peak crystallisation temperature is suitably determined using differential scanning calorimetry and a cooling rate of 20° min.

It has been found that adding said nucleating agent to said polycondensation reaction mixture provides a surprising and unexpected increase in peak crystallisation temperature.

As will be understood by those skilled in the art, a true comparison of peak crystallisation temperatures ($T_c$), can only be made for those polymers having approximately the same inherent viscosity (IV) as hereinafter defined. Preferably, the inherent viscosities will differ by less than 10%.

Preferably, the increase in peak crystallisation temperature is of at least 2° C., preferably at least 5° C. and, more preferably, at least 8° C.

Although the process may be used advantageously for making crystallisable aromatic polymers having any desired IV value, the process may be particularly advantageous for making polymers having relatively high IV values. The IV of the polymer made in the process may be at least 0.75 dlg$^{-1}$; it is preferably at least 1.0 dlg$^{-1}$. The process may be used for making polymers having an IV in the range 0.33–1.33 dlg$^{-1}$.

It is believed that $T_c$ increases in the process of the invention because of an increase in the nucleation density of the polymer.

The anion, —A—, is preferably a carboxylate and, most preferably, a sulphonate. The cation, X, is preferably sodium or lithium, sodium being especially preferred.

The nucleophilic group preferably includes an oxygen or sulphur moiety suitably bonded to a Ph group of said nucleating agent. More preferably, an oxygen moiety is bonded to said Ph group. The nucleophilic group preferably includes a hydrogen atom or a metal ion, suitably an alkali metal ion, for example a sodium or lithium ion. Said nucleophilic group most preferably includes a hydrogen atom.

One possible nucleating agent is HSPhSO$_3$Na. A preferred nucleating agent is NaOPhSO$_3$Na. Most preferably, the nucleating agent is HOPhSO$_3$Na, where "Ph" is used here and throughout this specification to denote "1,4-phenylene".

In a preferred embodiment of the invention, the amount of nucleating agent is within the range 0.5 mole % to 5 mole % based on the monomer present at the start of the polycondensation reaction in the least quantity. Preferably, at least 0.75 mole %, more preferably, at least 0.9 mole % of said nucleating agent is present. Preferably, less than 2.5 mole % of said nucleating agent is present.

Suitably, the reaction product of said polycondensation reaction is not isolated prior to the addition of said nucleating agent. Preferably, the nucleating agent is added after the polycondensation is essentially complete and the amount of monomer units remaining in the polymerisation mixture is small, to minimise any possible reaction of the nucleating agent with the monomers. After adding the nucleating agent the reaction is continued for at least 10 minutes, preferably at least 30 minutes. By "essentially complete" is meant that the polycondensation has proceeded to form a polymer preferably within 0 to 15%, most preferably 0 to 10%, of the required molecular weight, as determined by the inherent viscosity.

In a preferred form of the invention, the monomers are preferably selected from compounds of formula I and II:

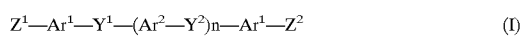

$$Z^1\text{—Ar}^1\text{—Y}^1\text{—(Ar}^2\text{—Y}^2)n\text{—Ar}^1\text{—Z}^2 \qquad (I)$$

$$Z^3\text{—AR}^3\text{—Z}^4 \qquad (II)$$

wherein:

Ar$^1$ is 1,4-phenylene or a polyaromatic group containing at least two aromatic groups which are directly linked;

Ar$^2$ is a 1,4- or 1,3-phenylene or a polyaromatic group containing at least two aromatic groups which are directly linked;

Ar$^3$ is a 1,4-phenylene or a polyaromatic group containing at least two aromatic groups which are directly linked together or are linked by —CO—, —SO— or —SO$_2$— groups or a divalent hydrocarbon radical;

Z$^1$, Z$^2$, Z$^3$ and Z$^4$ are, independently of one another, a halogen atom, —OH or —SH and, when Z$^3$ and/or Z$^4$ is a halogen atom the group $Ar^3$ is such that the or each halogen atom is activated by an inert electron-withdrawing group in at least one of the positions ortho- or para- to the or each halogen atom;

$Y^1$ and $Y^2$ are, independently of one another, an electron withdrawing group; and n is 0, 1 or 2.

The divalent aromatic units in the aromatic polymer may include multiple units in which divalent aromatic radicals are linked together through a direct link or through single atom groups, other than O or S, or through alkylene. By "single atom groups" is meant a divalent atom or an atom of valency greater than 2 carrying substituent(s) satisfying valency in excess of 2. This definition includes, for example, electron-withdrawing groups such as —CO—, —SO$_2$— and —SO— and electron-donating groups such as —CR$_2$— where R is hydrogen, $C_1$ to $C_6$ alkyl, phenyl or the two groups R (which otherwise may be the same or different) are joined externally to form a cycloaliphatic ring.

Particular examples of suitable multiple units are based on:

biphenyl terphenyl benzophenone diphenylsulphone bis-1,4-(benzoyl)benzene bis-1,4-(phenylsulphonyl)benzene bis-1,4-(benzoyl)biphenyl bis-1,4-(phenylsulphonyl)biphenyl diphenylmethane 2,2'-diphenylpropane.

Preferred polymers made in accordance with the process of the invention comprise repeating units connected by ether linkages, said repeating units being selected from one of the following groups of units:

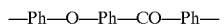
a)

ether alone or together with other repeating units, which polymers are described in EP 1879B2, U.S. Pat. No. 4,320,224;

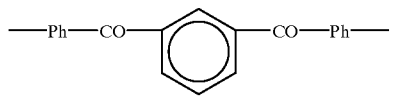
b)

and —Ar—
where Ar is 4,4'-biphenylene or 4,4"-terphenylene either alone or together with other repeating units, which polymers are described in EP-A-323076, U.S. Pat. No. 4,970,284; and

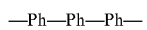
c)

especially with

which polymers are described in EP-A-383600

The proportions of the monomers and the nature of the end groups are chosen so that the halogen and the groups —OH and/or —SH are substantially equimolar. It is convenient to use compounds in which the end groups are the same, for example both halogen, especially fluorine or chlorine, or both —OH groups. However, mixtures of compounds may be used.

Preferably, the halogen atoms are chlorine or, especially, fluorine. The use of substantially equimolar amounts of halogen and —OH and/or —SR groups is desirable since an excess of either results in a reduction in the molecular weight of the polymer obtained. A slight excess of either halogen or —OH groups may be used, for example an excess of up to 5 mole % especially up to 2 mole % and, in particular, an excess of halogen may be used to obtain the most stable polymers and to control molecular weight.

Alternatively, the molecular weight may also be controlled by the inclusion in the reaction mixture of a small proportion, for example less than 1 mole %, and especially less than 0.1 mole % relative to the monomers, of a monofunctional compound such as a phenol or, preferably an activated arylmonohalide.

The molecular weight may suitably be greater than 10,000. It is preferably greater than 15,000 and, more preferably, greater than 20,000. In some cases, aromatic polymers having molecular weights of greater than 25,000 or even greater than 35,000 may be advantageously made in the process.

The polycondensation reaction may be carried out in the presence of an inert solvent or in the absence of a solvent.

Preferably a solvent is employed and is an aliphatic or aromatic sulphoxide or sulphone of formula

where a is 1 or 2; and

R or $R^1$, which may the same or different, are alkyl or aryl groups, and may together form a divalent radical. Solvents of this type include dimethyl sulphoxide, dimethyl sulphone, and sulpholane (cyclic tetramethylene sulphone) but the preferred solvents are aromatic sulphones of the formula

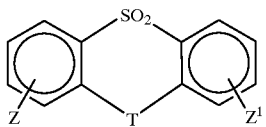

where T is a direct link, an oxygen atom or two hydrogen atoms (one attached to each benzene ring); and Z and $Z^1$, which may be the same or different, are hydrogen atoms, alkyl, alkaryl, aralkyl or aryl groups.

Examples of such aromatic sulphones include diphenylsulphone, ditolylsulphone, dibenzothiophen dioxide, phenoxathiin dioxide and 4-phenylsulphonyl biphenyl.

Diphenylsulphone is the preferred solvent. Other solvents that may be used include N,N-dimethyl formamide, N-methyl-2-pyrrolidone and benzophenone.

The polycondensation reaction is suitably effected in the presence of at least one base. Said base is preferably a strong base and is preferably an inorganic base. Preferred bases include alkali metal hydroxides carbonates or bicarbonates.

If an alkali metal hydroxide is used, this is preferably pre-reacted with the phenol groups in the halophenol or bisphenol compounds used in the polycondensation to form an alkali metal halophenate or bisphenate. The salt should preferably be in a finely divided form, for example having a particle size of less than 1 mm, and preferably less than 500 micrometers.

If the base is an alkali metal carbonate or bicarbonate, these are preferably used as the anhydrous materials. However, if hydrated salts are employed, these may be dehydrated during the period of heating up to the polymerisation temperature when a sufficiently high polymerisation temperature is being used.

The alkali metal hydroxide, carbonate or bicarbonate should be used in at least the stoichiometric proportion with respect to the phenolic groups in the starting compounds.

It is preferred to use a slight excess of the base and this is preferably an excess of in the range from 1 to 25 mole %, particularly from 1 to 5 mole %, relative to the proportion of phenolic groups present in the compounds.

Preferably, the polymerisation is carried out at a temperature in the range 150–400° C.

The polymers can be used neat, with possibly a stabiliser such as phosphate. They can be blended with other polymers, for example polymers within the invention but of different molecular weight, or other polyethersulphones, or polyetherketones or more than one of these.

Further they can be blended with polymers differing more greatly from themselves.

The invention includes compositions in which conventional additives are present. Examples are: non-fibrous fillers such as graphite, boron nitride, mica, talc and vermiculite; and short or long fibres such as glass, carbon, graphite and polyparaphenyleneterphthalamide. The invention includes compositions in which conventional additives are present. The content of such additives is typically in the range 5–70% by weight, for example 5–30% of boron nitride, at least 20% by weight of short fibre, or 50–70% by volume of continuous fibre.

The polymer or compositions can be processed for example as follows:

neat or blended: by extrusion as sheet or film or onto wire or by injection moulding;

with non-fibrous or short fibre: by injection moulding;

with continuous fibre, for example by lamination of polymer film with a mat or cloth, or by passing continuous fibre through molten polymer or a mixture containing polymer in dissolved or dispersed state the resulting impregnated fibre sheets can be laminated together by heat and pressure to give anisotropic or quasiisotropic structures, depending on the relative orientation of successive sheets;

with medium length fibre, for example by extruding with continuous fibre into a lace, chopping to give granules and injection moulding or extruding the granules.

Figure 1B:
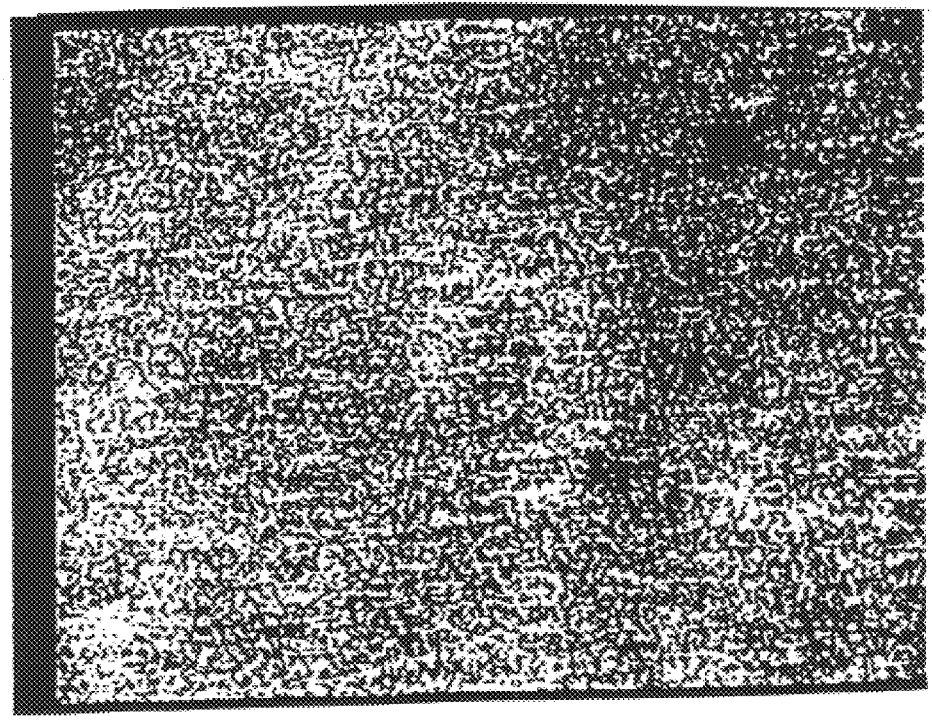
Figure 2:
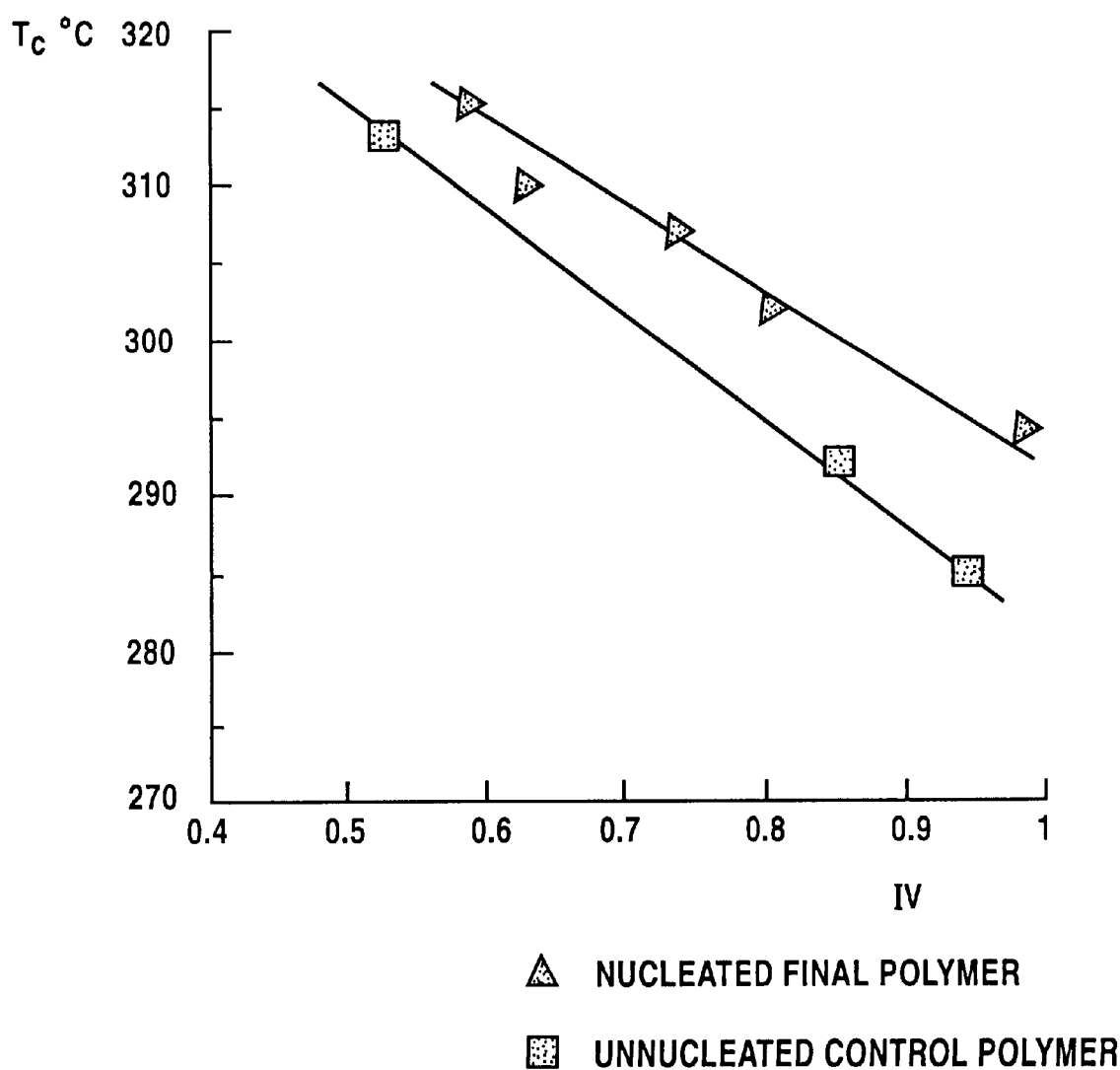
FIG. 2 is a plot of the peak crystallization temperature ($T_c$) versus inherent viscosity (IV) for examples 5 to 7.

The invention is illustrated by reference to the following examples and by reference to the accompanying drawings, in which:

FIGS. 1a and 1b are polarised light micrographs of the product of example 1(b). The samples were melted at 380° C. for 3 minutes and then fast cooled (99° C. min$^{-1}$) to 285° C. The two micrographs were taken at 285° C. after 3 minutes; and FIG. 2 is a plot of peak crystallisation temperature ($T_c$) versus inherent viscosity (IV) for examples 5 to 7.

The inherent viscosity (IV) is measured in a solution of 0.10 g polymer in 100 ml of 98% sulphuric acid at 25° C.

The peak crystallisation temperature ($T_c$) is determined by cooling a melt of the polymer at a rate of 20° min$^{-1}$. For any given value of IV, the higher the $T_c$ the faster the polymer will crystallise. The $T_c$ is measured by differential scanning calorimetry (DSC).

The crystalline content is obtained by comparing the area of the crystallisation exotherm to that calculated for a hypothetical 100% crystalline polyetheretherketone (PEEK) sample.

In the examples, the 1,3-bis-(4-fluoro-benzoyl)-benzene used was prepared by a standard Friedel-Crafts reaction between isophthaloyl chloride and fluorobenzene. The 4,4'-dihydroxybiphenyl, diphenylsulphone, 4,4'-difluorobenzophenone, hydroquinone, 4,4'-difluoro diphenylsulphone, sodium carbonate and potassium carbonate used were commercially-available materials. The 4,4"-dihydroxyterphenylene was prepared by a process starting from 1,4-cyclohexanedione as described by EP-A-343 798. The HOPhSO$_3$Na used was a dihydrate supplied by BDH, GPR grade; the NaOPhSO$_3$Na used was a dihydrate made by neutralisation of HOPhSO$_3$Na with NaOH solution, supplied by BDH, Convol grade; and the LiOPhSO$_3$Li used was made by neutralisation of HOPhSO$_3$H, supplied by Aldrich, GPR grade, with LiOH.H$_2$O supplied by BDH, GPR grade;

By "sampled" is meant a sample is sucked out of the reaction mixture via a PTFE tube (approximately 5 mm diameter), which passes into the reaction flask via one of its necks, using a Pumpette bulb. When the sample has cooled, the PTFE tube is cut exposing a solid plug of product. This product when treated as required, for example leached, is the control (C).

In the example the mole % of nucleating agent is based on the monomer present in the reaction flask in the least quantity.

The relative nucleation density of two samples can be calculated using the relationship $$N_1 G_1^3 t_1^3 = N_2 G_2^3 t_2^3$$

where $N_1$ and $N_2$ are the respective nucleation densities at temperature T, $G_1$ and $G_2$ the respective spherulitic growth rates and $t_1$ and $t_2$ are the respective times to the peak of the isothermal crystallisation exotherm at the temperature T, and as discussed in Polymer, 1990, 30, 1429.

Values of t are measured by DSC, for both samples. From this date, and the above equation, the relative nucleation densities of two samples can be calculated assuming $G_1 = G_2$. This assumption is reasonable if the two samples have similar IV's.

EXAMPLE 1

To a 3-necked, round-bottomed, glass reaction flask of 250 ml capacity equipped with an overhead stirrer and nitrogen inlet, was added 1,3-bis-(4-fluoro-benzoyl)-benzene (0.102 m, 32.88 g), 4,4'-dihydroxybiphenyl (0.100 m, 18.62 g) and diphenylsulphone (78.00 g).

The flask was placed in a heated liquid metal bath and when the temperature of the flask contents had reached about 175° C., sodium carbonate (0.100 m, 10.60 g; and potassium carbonate (0.002 m, 0.28 g) were added with stirring and under nitrogen. The temperature was maintained at 175° C. for 5 minutes and then increased, at a rate of 1° C./minute, until the temperature of the flask contents had reached 300° C. The temperature 300° C. was maintained for about 50 minutes and then a further portion of 1,3-bis-(4-fluoro-benzoyl)-benzene (0.001 m, 0.32 g) added.

The reaction mixture was allowed to react for 10 minutes before being sampled. (After being "sampled" the product was milled, in a bench top rotary hammer mill to pass a 3 mm screen, and then leached and dried as described below.) Thereafter, HOPhSO$_3$Na (varying amounts—see Table 1) was added and the resulting reaction mixture allowed to react for a further 30 minutes.

The product was poured out onto an aluminium sheet, allowed to cool and solidify and then broken up and milled, in a bench top rotary hammer mill, to pass a 3 mm screen.

Diphenyl sulphone and the inorganics were removed by leaching the product with acetone (2 liters), cold demineralised water (200 ml), hot demineralised water (2 liters) and finally acetone (200 ml).

The polymer was dried in vacuum at 80° C. for 2 hours and at 100° C. for 2 hours. Subsequently, it was dried at 120° C. overnight, without vacuum.

The IV of the final product (F) and of the control (C), ie the sampled product, were measured. These values, together with the $T_c$ and crystalline contents of the various products, are given in Table 1.

The polymer contained a repeat unit of formula (III).

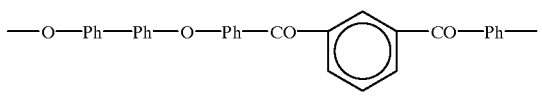

(III)

TABLE 1

| Example | mole % HOPhSO$_3$Na added | IV dlg$^{-1}$ | $T_c$ ° C. | crystalline content % |
|---|---|---|---|---|
| a | C 0 | 1.04 | — | 0 |
|   | F 1 | 1.02 | 264 | 31 |
| b | C 0 | 1.03 | — | 0 |
|   | F 2 | 1.07 | 265 | 34 |
| c | C 0 | — | — | 0 |
|   | F 5 | 0.95 | 256 | 29 |

A polarised light micrograph was taken of the polymer of example 1(b) before and after the addition of HOPhSO$_3$Na. A comparison of FIGS. 1(a) and 1(b) reveals the nucleation density (as indicated by the relative density of the white to black portions) has significantly increased after addition of HOPhSO$_3$Na. At 270° C. the nucleation density of the nucleated final (F) polymer was found to be approximately 216 times greater than that of the unnucleated control (c) polymer.

EXAMPLE 2

Example 1 was repeated except HOPhSO$_3$Na was replaced by different nucleating agents. In each case 2 mole % of the nucleating agent was added to the reaction mixture. The polymer contained the repeat unit of formula (III).

The IV of the final product (F) was measured. The IV's together with the $T_c$ and crystalline contents, of the various products, are given in Table 2.

TABLE 2

| Example | type of nucleating agent added | IV dlg$^{-1}$ | $T_c$ ° C. | crystalline content |
|---|---|---|---|---|
| C | — | 1.15 | — | 0 |
| F | NaOPhSO$_3$Na | 1.21 | 248 | 13 |
| F | LiOPhSO$_3$Li | 0.91 | 252 | 3 |

EXAMPLE 3

To a 3-necked, round-bottomed, glass reaction flask of 500 ml canacity, equipped with an overhead stirrer and nitrogen inlet, was added 1,3-bis-(4-fluoro-benzoyl)-benzene (0.204 m, 65.75 g), 4,4'-dihydroxybiphenyl (0.200 m, 37.42 g) and diphenylsulphone (156.00 g).

The flask was placed in a heated metal bath and when the temperature of the flask contents had reached about 170° C., sodium carbonate (0.200 m, 21.20 g) and potassium carbonate (0.004 m, 0.56 g) were added with stirring and under nitrogen. The temperature was maintained at 170° C. for 5 minutes and then increased, at a rate of 1° C./minute, until the temperature of the flask contents had reached 300° C. The temperature of 300° C. was maintained for about 60 minutes and then a further portion of 1,3-bis-(4-fluoro-benzoyl)-benzene (0.002 m, 0.64 g) added.

The reaction mixture was allowed to react for 5 minutes. The product was then poured out into an aluminium sheet, allowed to cool and solidify and then broken up and milled, in a bench top rotary hammer mill, to pass a 3 mm screen.

Diphenyl sulphone and the inorganics were removed by leaching the product with acetone (4 liters), cold demineralised water (200 ml), hot demineralised water (4 liters), cold demineralised water (200 ml), hot demineralised water (4 liters) and finally acetone (200 ml).

The polymer was dried under vacuum at 140° C. and found to have an IV of 1.11 dlg$^{-1}$.

The polymer contained a repeat unit of formula (III).

DSC gave a $T_1$ of 253° C. The crystalline content of the product was found to be 18%.

EXAMPLE 4

A portion of the polymer prepared according to Example 3 was slurried with an aqueous solution of NaOPhSO$_3$Na (1% w/w based on the concentration of the polymer) and then dried overnight (approximately 16 hours) at 120° C. in an air circulating oven. The resulting product comprised powdered polymer carrying a homogeneous deposit of NaOPhSO$_3$Na. This product was subjected to various pretreatments before being examined by DSC. The results obtained are given in Table 3.

TABLE 3

| Pretreatment | $T_c$ ° C. | crystalline content % |
|---|---|---|
| Example 3 | 253 | 18 |
| no pretreatment & no NaOPhSO$_3$Na added** | | |
| no pretreatment | — | 0 |
| dried at 300° C. in N$_2$ for 60 minutes | 245 | 7 |
| dried at 300° C. in vacuum for 60 minutes** | 258 | 23 |
| heated in DPS soiution (20% w/w) at 300° C. for 120 minutes, sampled and then leached* | — | 0 |
| heated in DPS solution (20% w/w) at 300° C. for 350 minutes, sampled and then leached* | 253 | <1 |

Leached* means the product was washed successively with acetone, a water/acetone mixture (2:1 volume ratio) and acetone.
**The relative nucleation density of these two samples ($T_c$ = 258/$T_c$ = 253) at 270° C. was determined and found to be approximately 4.

These results show when the aromatic polymer is blended with the nucleating agent the value of $T_c$ does not change significantly.

EXAMPLE 5

To a 3-necked, round-bottomed, glass reaction flask of 250 ml capacity equipped with an overhead stirrer and nitrogen inlet, was added 1,3-bis-(4-fluoro-benzoyl)- benzene (0.102 m, 32.88 g), 4,4'-dihydroxybiphenyl (0.100 m, 18.62 g) and diphenylsulphone (78.00 g).

The flask was placed in a heated liquid metal bath and when the temperature of the flask contents had reached about 173° C., sodium carbonate (0.100 m, 10.60 g) and potassium carbonate (0.002 m, 0.28 g) were added with stirring and under nitrogen. The temperature was then increased, at a rate of 1° C./minute, until the temperature of the flask contents had reached 300° C. The temperature of 300° C. was maintained for 50 minutes and then a further portion of 1,3-bis-(4-fluoro-benzoyl)-benzene (0.001 m, 0.32 g) added.

The reaction mixture was allowed to react for 10 minutes before being sampled. (After being "sampled" the sample product was milled, in a bench top rotary hammer mill to pass a 3 mm screen, and then leached as described below). Thereafter, HOPhSO$_3$Na.(0.5 mole %) was added to the main reaction and the resulting reaction mixture allowed to react for a further 30 minutes.

The product was poured out onto an aluminium sheet, allowed to cool and solidify and then broken up and milled, in a bench top rotary hammer mill, to pass a 3 mm screen.

EXAMPLE 6

To a 3-necked, round-bottomed, glass reaction flask of 250 ml capacity, equipped with an overhead stirrer and nitrogen inlet, was added difluorobenzophenone (0.100 m, 21.82 g), hydroquinone (0.100 m, 11.01 g) and diphenyl-sulphone (60.00 g).

The flask was placed in a heated metal bath and when the temperature of the flask contents had reached about 115° C. and the flask contents were liquid, sodium carbonate (0.100 m, 10.60 g), potassium carbonate (0.002 m, 0.28 g) and HOPhSO$_3$Na (1 mole %) were added with stirring and under nitrogen. Following these additions the flask cntents were heated as follows:—175° C. for 60 minutes, 200° C. for 30 minutes, 250° C. for 20 minutes and 300° C. for 120 minutes.

The resulting product was poured out onto an aluminium sheet, allowed to cool and solidify and then broken up and milled, in a bench top rotary hammer mill, to pass a 3 mm screen.

Diphenyl sulphone and the inorganics were removed by leaching the product with acetone (2 liters), cold demineralised water (100 ml), hot demineralised water (2 liters) and finally acetone (100 ml).

The polymer was dried at 140° C. and found to have an IV of 0.58 dlg$^{-1}$.

The polymer contained a repeat unit of formula (IV)

—Ph—Co—Ph—O—Ph—O—  (IV)

DSC gave a T$_c$ of 315° C.

The example was then repeated. The IV's and T$_c$ for the various repeat runs are given in Table 4.

EXAMPLE 7

Example 6 was repeated except the amount of HOPhSO$_3$Na added was reduced to 0.5 mole %. The IV and T$_c$ for the polymers formed in two runs is given in Table 4.

EXAMPLE 8

Example 6 was repeated except in this case no HOPhSO$_3$Na was added to the reaction mixture. The IV and T$_c$ for the polymers formed in the three runs is given in Table 4.

TABLE 4

| Example | mole % HOPhSO$_3$Na added | IV dlg$^{-1}$ | Tc ° C. |
|---|---|---|---|
| 6a | 1 | 0.58 | 315 |
| 6b | 1 | 0.62 | 310 |
| 6c | 1 | 0.73 | 307 |
| 7a | 0.5 | 0.80 | 302 |
| 7b | 0.5 | 0.98 | 294 |
| 8a | — | 0.52 | 313 |
| 8b | — | 0.85 | 292 |
| 8c | — | 0.94 | 285 |

The results in Table 4 clearly show the T$_c$ values of polymers prepared in the presence of HOPhSO$_3$Na were generally higher than those prepared in the absence of this salt.

In order to obtain a measure of the effectiveness of the nucleating agent it is necessary to compare the T$_c$ values of control (no HOPhSO$_3$Na added) and nucleated samples having the same IV. To overcome the difficulty of preparing control and nucleated samples having the same IV a measure of the effectiveness of the nucleating agent can be obtained by plotting T$_c$ versus IV for each of the samples. FIG. 2 shows such a plot in which nucleated samples are displaced to a higher Tc relative to the control samples.

EXAMPLE 9

To a 3-necked, round-bottomed, glass reaction flask of 250 ml capacity, equipped with an overhead stirrer and nitrogen inlet, was added difluorobenzophenone (0.100 m, 21.82 g), hydroquinone (0.100 m, 11.01 g) and diphenyl-sulphone (60.00 g).

The flask was placed in a heated metal bath and when the temperature of the flask contents had reached about 115° C. and the flask contents were liquid, sodium carbonate (0.100 m, 10.60 g), and potassium carbonate (0.002 m, 0.28 g) were added with stirring and under nitrogen. Following these additions the flask contents were heated as follows:—175° C. for 60 minutes, 200° C. for 30 minutes, 250° C. for 30 minutes and 300° C. for 60 minutes.

Thereafter a further portion of difluorobenzophenone was added and allowed to react for 10 minutes. The product was sampled and then HOPhSO$_3$Na (2 mole %) added and allowed to react for 30 minutes.

The resulting product was poured out onto an aluminium sheet, allowed to cool and solidify and then broken up and milled, in a bench top rotary hammer mill, to pass a 3 mm screen.

Diphenyl sulphone and the inorganics were removed by leaching the product with acetone (2 liters), cold demineralised water (100 ml), hot demineralised water (2 liters), and finally acetone (100 ml).

The polymer was dried at 140° C. and found to have an IV of 0.81 dlg$^{-1}$.

The polymer contained a repeat unit of formula (IV).

DSC gave a T$_c$ of 298° C.

The IV of the control was 0.88 dlg$^{-1}$ and DSC gave a T$_c$ of 273° C.

The polymer had a number average molecular weight of approximately 35000.

At 290° C. the nucleation density of the nucleated final (F) polymer was found to be approximately 60 times that of the unnucleated control (C) polymer.

EXAMPLE 10

To a reaction vessel, enclosed within a heated oil jacket, was added diphenylsulphone (124 kg). The vessel was equipped with a stirrer and nitrogen inlet.

When the temperature of the vessel contents had reached about 130° C. difluorobenzophenone (277.9 m, 60.6 kg) and hydroquinone (275 m, 30.28 kg) were added.

The temperature was then reduced to 120° C. before sodium carbonate (280.5 m, 29.73 kg) and potassium carbonate (5.43 m, 0.76 kg) were added with stirring and under nitrogen. Following these additions the contents of the reaction vessel were heated as follows: 175° C. for 60 minutes, 200° C. for 60 minutes and 300° C. for 120 minutes.

Thereafter a further portion of difluorobenzophenone was added and allowed to react for a further 5 minutes. The product was allowed to drain out of the bottom of the reaction vessel and onto a water-cooled metal conveyor belt.

The product was collected, milled and then leached with acetone and water.

The polymer contained a repeat unit of formula (IV). It had a number average molecular weight of approximately 40 000.

DSC gave a $T_c$ of 282° C.

EXAMPLE 11

A portion of the polymer prepared according to Example 10 was slurried with an aqueous solution of NaOPhSO$_3$Na (1% w/w based on the concentration of the polymer) and then dried overnight (approximately 16 hours) at 120° C. in an air circulating oven. The resulting product comprised powdered polymer carrying a homogeneous deposit of NaOPhSO$_3$Na. This product was subjected to various pretreatments before being examined by DSC. The following results were obtained.

TABLE 5

| Pretreatment | $T_c$ ° C. |
| --- | --- |
| Example 10 | 282 |
| no pretreatment & no NaOPhSO$_3$Na added | |
| no pretreatment | 268 |
| dried at 300° C. in N$_2$ for 60 minutes | 267 |
| dried at 300° C. in vacuum for 60 minutes | 286 |
| heated in DPS solution (20% w/w) at 300° C. for 150 ininutes, sampled and then leached. | 273 |

These results show when the polymer of Example 10 is blended with the nucleating agent the value of $T_c$ does not change significantly.

EXAMPLE 12

To a 3-necked, round-bottomed, glass reaction flask of 250 ml capacity, equipped with an overhead stirrer and nitrogen inlet, was added difluorodiphenylsulphone (0.0808 m, 20.52 g), dihydroxyterphenylene (0.080 m, 21.00 g) and diphenylsulphone (100.00 g).

The flask was placed in a heated metal bath and when the temperature of the flask contents had reached about 185° C. and become liquid, the temperature was allowed to fall to 175° C. Potassium carbonate (0.0816 m, 11.28 g) was then added with stirring, under nitrogen. Following this addition, the flask contents were heated as follows:—175° C. for 60 minutes, 200° C. for 30 minutes, 250° C. for 50 minutes, and 300° C. for 150 minutes.

Thereafter, the product was sampled and then HOPhSO$_3$Na (0.016 m, 0.37 g) added and allowed to react for 30 minutes.

The resulting product was poured out onto an aluminium sheet. This product (F), together a portion of the control (C), were each, individually, worked up using a mixture of acetone and methanol, in a 1:1 volume ratio, hot water and finally acetone. The products were then dried under vacuum at 140° C. and the product (F) found to have an IV of 0.40 dlg$^{-1}$.

The polymer contained a repeat unit of formula (V).

—O—Ph—Ph—Ph—O—Ph—SO$_2$—Ph—    (V)

DSC gave the following values for $T_c$. The following values were obtained for crystalline content.

| Product | IV dlg$^{-1}$ | $T_c$/° C. | Crystalline content % |
| --- | --- | --- | --- |
| C | 0.34 | 302 | 17 |
| F | 0.40 | 346 | 26 |

EXAMPLE 13

To a 3-necked, round-bottomed, glass reaction flask of 250 ml capacity, equipped with an overhead stirrer and nitrogen inlet, was added 1,3-bis-(4-fluoro-benzoyl)-benzene (0.101 m, 32.55 g), 4,4'-dihydroxybiphenyl (0.100 m, 18.62 g), diphenylsulphone (78.00 g) and HOPhSO$_3$Na (1%).

The flask was placed in a heated liquid metal bath and when the temperature of the flask contents had reached about 175° C., sodium carbonate (0.100 m, 10.60 g) and potassium carbonate (0.002 m, 0.28 g) were added with stirring and under nitrogen. The temperature was maintained at 175° C. for 5 minutes and then increased, at a rate of 1° C./minute, until the temperature of the flask contents had reached 300° C. The temperature of 300° C. was maintained for about 50 minutes and then a further portion of 1,3-bis-(4-fluoro-benzoyl)-benzene (0.001 m, 0.32 g) added.

The reaction mixture was allowed to react for 10 minutes before being poured out onto an aluminium sheet. It was allowed to cool and solidify and then broken up and milled, in a bench top rotary hammer mill, to pass a 3 mm screen.

Diphenyl sulphone and the inorganics were removed by leaching the product with acetone (2 liters), cold demineralised water (200 ml), hot demineralised water (2 liters) and finally acetone (200 ml).

The polymer was dried in a vacuum at 90° C. for 2 hours and at 100° C. for 2 hours. Subsequently, it was dried at 120° C. overnight, without vacuum.

The polymer was found to have an IV of 1.02 dlg$^{-1}$. The polymer contained a repeat unit of formula (III).

DSC gave a $T_c$ of 266° C. and a crystalline content of 34%.

What is claimed is:

1. A process for making a crystallisable polymer having divalent aromatic units connected by ether and/or thioether linkages and having a molecular weight greater than 10,000 as determined by inherent viscosity, the process comprising forming a polycondensation reaction mixture containing difunctional monomers having phenolic and/or thiophenolic and/or halogenic end groups, polycondensing the difunctional monomers to form the polymer, and thereafter isolating the polymer from the polycondensation reaction mixture, wherein a nucleating agent is added to the polycondensation reaction mixture during the polycondensing step when the polymer is within 15% of the molecular weight of the isolated polymer, the nucleating agent comprising a nucleophilic group and a group of formula —A—X, where X is a metal cation and A is an anion, wherein X and A are selected
(1) to provide the isolated polymer with a peak crystallisation temperature which is higher than a peak crystallisation temperature of a crystallisable polymer having the same molecular weight and which is made without the addition of the nucleating agent; or
(2) to make the isolated polymer crystallisable, as compared to a non-crystallisable polymer having the same moleculare weight and which is made without the addition of the nucleating agent.

2. A process for making a crystallisable polymer having divalent aromatic units connected by ether and/or thioether linkages and having a molecular weight greater than 10,000 as determined by inherent viscosity, the process comprising forming a polycondensation reaction mixture containing difunctional monomers having phenolic and/or thiophenolic and/or halogenic end groups, polycondensing the difunctional monomers to form the polymer, and thereafter isolating the polymer from the polycondensation reaction mixture, wherein a nucleating agent is added to the polycondensation reaction mixture during the polycondensing step when the polymer is within 15% of the molecular weight of the isolated polymer, the nucleating agent comprising a nucleophilic group and a group of formula —A—X, where X is a metal cation and A is an anion, wherein X and A are selected to give an increase in peak crystallisation temperature as compared to the peak crystallisation temperature, if obtainable, of a polymer having the same molecular weight and which is made without the addition of the nucleating agent; or, if said polymer having the same molecular weight and which is made without the addition of the nucleating agent is not crystallisable, X and A are selected to make a crystallisable polymer.

3. A process according to claim 2, wherein the difunctional monomers are selected from the group consisting of compounds of formula (I) and (II):

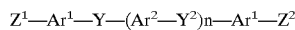   (I)

   (II)

wherein
$Ar^1$ is 1,4-phenylene or a polyaromatic group containing at least two aromatic groups which are directly linked;

$Ar^2$ is a 1,4- or 1,3-phenylene or a polyaromafic group containing at least two aromatic groups which are directly linked;

$Ar^3$ is a 1,4-phenylene or a polyaromatic group containing at least two aromatic groups which are directly linked or are linked by —CO—, —SO— or —SO$_2$— groups or a divalent hydrocarbon radical;

$Z^1$, $Z^2$, $Z^3$ and $Z^4$ are, independently, of one another, a halogen atom, —OH or —SH, wherein when $Z^3$ and/or $Z^4$ is a halogen atom, the group $Ar^3$ is such that the halogen atom is activated by an inert electron-Withdrawing group in at least one of the positions ortho- or para- to the halogen atom;

$Y^1$ and $Y^2$ are, independently, of one another, an electron withdrawing group; and n is 0, 1 or 2.

4. A process according to claim 2, wherein the anion A is carboxylate or sulphonate.

5. A process according to claim 2, wherein said cation is an alkali metal cation.

6. A process according to claim 2, wherein the nucleophilic group includes an oxygen or sulphur moiety.

7. A process according to claim 2, wherein said nucleating agent is of general formula Nuc—Ph—A—X wherein "Nuc" represents said nucleophilic group and "Ph" represents an optionally substituted phenyl group.

8. A process according to claim 2, wherein the amount of nucleating agent added to the polycondensation reaction mixture is within the range 0.5 mole % to 5 mole % based on the monomer present at the start of the polycondensation reaction in the least quantity.

9. A process according to claim 1, wherein the process is for making polymers having an inherent viscosity (IV) measured in a solution of 0.10 g polymer in 100 ml of 98% sulphuric acid at 25° C. in the range of 0.33–1.33 dlg$^{-1}$.

10. A process according to claim 2, wherein the process is for making polymers having a number average molecular weight greater than 15,000.

11. A process according to claim 2, wherein the difuncfional monomers include at least one monomer selected from a first group consisting of 1,3-bis-(4-fluorobenzoyl)-benzene, 4,4'-difluorobenzophenone and 4,4'-difluoro diphenylsulphone, and at least one monomer selected from a second group consisting of 4,4'-dihydroxybiphenyl, hydroquinone and 4,4'-dihydroxyterphenylene.

* * * * *